(12) United States Patent
Moras et al.

(10) Patent No.: US 11,008,925 B2
(45) Date of Patent: May 18, 2021

(54) METHOD FOR MONITORING THE EFFECTIVENESS OF A THREE-WAY CATALYTIC CONVERTER OF A GASOLINE ENGINE

(71) Applicant: Dr. Ing. h.c. F. Porsche Aktiengesellschaft, Stuttgart (DE)

(72) Inventors: Matthias Moras, Schoemberg (DE); Christian Bosser, Aachen (DE)

(73) Assignee: Dr. Ing. h.c. F. Porsche Aktiengesellschaft, Stuttgart (DE)

(*) Notice: Subject to any disclaimer, the term of this patent is extended or adjusted under 35 U.S.C. 154(b) by 0 days.

(21) Appl. No.: 16/656,633

(22) Filed: Oct. 18, 2019

(65) Prior Publication Data

US 2020/0131971 A1   Apr. 30, 2020

(30) Foreign Application Priority Data

Oct. 26, 2018 (DE) .................... 10 2018 126 767.3

(51) Int. Cl.
*F01N 3/10* (2006.01)
*F01N 11/00* (2006.01)
*F01N 13/00* (2010.01)

(52) U.S. Cl.
CPC .......... *F01N 11/007* (2013.01); *F01N 3/101* (2013.01); *F01N 13/008* (2013.01); *F01N 2560/025* (2013.01); *F01N 2560/026* (2013.01); *F01N 2900/0416* (2013.01); *F01N 2900/1621* (2013.01)

(58) Field of Classification Search
CPC ........ F01N 3/101; F01N 11/00; F01N 11/007; F01N 13/008; F01N 2550/02; F01N 2560/025; F01N 2560/026; F01N 2900/0416; F01N 2900/1621
See application file for complete search history.

(56) References Cited

U.S. PATENT DOCUMENTS 5,625,750 A * 4/1997 Puskorius ........... F02D 41/1405
706/21
2002/0144502 A1   10/2002 Beer et al.
(Continued)

FOREIGN PATENT DOCUMENTS

DE   19931321 A1   1/2001
DE   10014239 A1   10/2001
(Continued)

*Primary Examiner* — Audrey K Bradley
(74) *Attorney, Agent, or Firm* — Leydig, Voit & Mayer, Ltd.

(57) ABSTRACT

The present invention provides a method for monitoring effectiveness of a three-way catalytic converter of a gasoline engine. The method includes detecting emissions of the gasoline engine by an NOX sensor arranged within the three-way catalytic converter or downstream of the three-way catalytic converter in an exhaust-gas flow direction and transmitting values measured by the NOX sensor together with operating variables of the gasoline engine and/or of the three-way catalytic converter to a processor. The processor is configured to execute a simulation model and thereby calculate emissions values of a reference catalytic converter on the basis of the operating variables. The method further includes comparing the calculated emissions values with the values measured by the NOX sensor.

19 Claims, 5 Drawing Sheets

(56) References Cited

U.S. PATENT DOCUMENTS

2004/0250533 A1* 12/2004 Ketterer ............. F02D 41/0245
60/277
2010/0043400 A1   2/2010 Wang et al.
2019/0093540 A1*  3/2019 Devarakonda .......... F01N 3/101

FOREIGN PATENT DOCUMENTS

DE      10010745 A1    3/2002
DE   102009037585 A1   4/2010

\* cited by examiner

METHOD FOR MONITORING THE EFFECTIVENESS OF A THREE-WAY CATALYTIC CONVERTER OF A GASOLINE ENGINE

CROSS REFERENCE TO RELATED APPLICATIONS

This application claims benefit to German Patent Application No. DE 10 2018 126 767.3, filed Oct. 26, 2018, which is hereby incorporated by reference herein.

FIELD

The present invention relates to methods for monitoring the effectiveness of a three-way catalytic converter of a gasoline engine.

BACKGROUND

For aftertreatment of exhaust gases of a motor vehicle with a gasoline engine which is operated with a fuel-air mixture of stoichiometric composition, in the prior art use is made of three-way catalytic converters which exhibit so-called lambda control. During this exhaust-gas aftertreatment, the pollutants carbon monoxide (CO), nitrogen oxides ($NO_x$) and hydrocarbons (HC) that form during combustion of the fuel-air mixture are converted into carbon dioxide ($CO_2$), nitrogen ($N_2$) and water vapor ($H_2O$).

The abovementioned lambda control is required for effective exhaust-gas aftertreatment with high efficiency of the conversion of the pollutants. It is the aim here for a so-called combustion air ratio $\lambda$, commonly also referred to as air number, to be controlled so as to lie in as narrow a range as possible around $\lambda=1$. A combustion air ratio of $\lambda=1$ means that complete fuel combustion takes place. The fed air mass thus corresponds to the air mass that is theoretically required for the complete combustion of the fuel. In the presence of a combustion air ratio of $\lambda<1$, a deficiency of air is present. This results in a rich fuel-air mixture with an excess of fuel. In the presence of a combustion air ratio of $\lambda<1$, an excess of air is present. This results in a lean fuel-air mixture.

Since effective exhaust-gas aftertreatment by means of a three-way catalytic converter is possible only in a relatively narrow range around $\lambda=1$ (the so-called Lambda window), the actual combustion air ratio $\lambda$ is detected by means of the lambda probe, and the fuel and/or air quantity is varied such that the combustion air ratio $\lambda$ attains the desired setpoint value.

The effectiveness of a three-way catalytic converter of a gasoline engine has hitherto been evaluated indirectly through a determination of an available oxygen storage capacity (OSC). Here, the combustion air ratio $\lambda$, alternates between $\lambda<1$ (rich mixture) and $\lambda>1$ (lean mixture), such that, by means of the quantity of oxygen introduced into the three-way catalytic converter, it is possible to calculate the present value of the oxygen storage capacity, also referred to as the OSC value. Since it is necessary here for the monitored catalytic converter volume to be brought up to or close to the rich/lean breakthrough, this can under some circumstances result in a very great influence on the emissions result.

SUMMARY

In an embodiment, the present invention provides a method for monitoring effectiveness of a three-way catalytic converter of a gasoline engine. The method includes detecting emissions of the gasoline engine by an NOX sensor arranged within the three-way catalytic converter or downstream of the three-way catalytic converter in an exhaust-gas flow direction and transmitting values measured by the NOX sensor together with operating variables of the gasoline engine and/or of the three-way catalytic converter to a processor. The processor is configured to execute a simulation model and thereby calculate emissions values of a reference catalytic converter on the basis of the operating variables. The method further includes comparing the calculated emissions values with the values measured by the NOX sensor.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
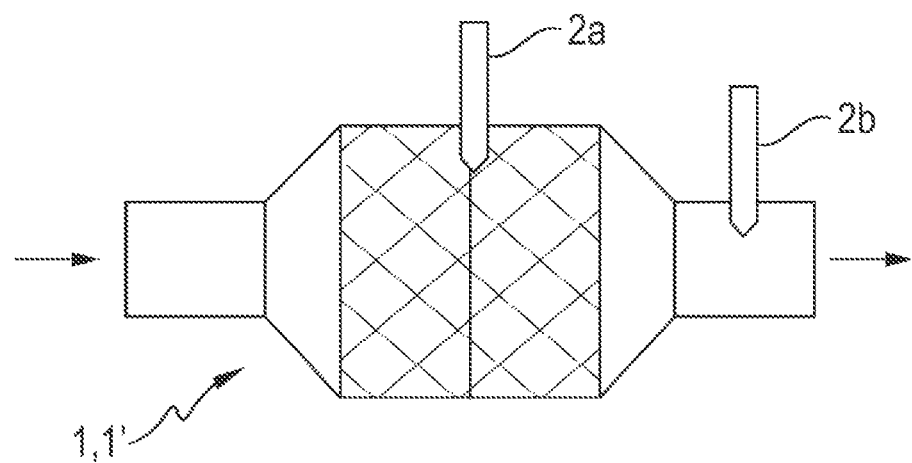
FIG. 1 is a schematically highly simplified illustration of a three-way catalytic converter with two possible installation locations of an $NO_X$ sensor.

The present invention includes methods for monitoring the effectiveness of a three-way catalytic converter of a gasoline engine, which methods permit the monitoring of the effectiveness by way of a direct measurement of emissions and in particular prevent influencing of emissions such as results in the prior art from the determination of the oxygen storage capacity.

Methods according to the invention for monitoring the effectiveness of a three-way catalytic converter of a gasoline engine include detecting emissions of the gasoline engine by a $NO_X$ sensor arranged within or, in an exhaust-gas flow direction, downstream of the three-way catalytic converter, and feeding the measured values of the $NO_X$ sensor together with operating variables of the gasoline engine and/or of the three-way catalytic converter to a processor, wherein the processor is configured to execute a simulation model and thereby calculate emissions values of a reference catalytic converter on the basis of the operating variables, and the calculated emissions values are compared with the measured values of the $NO_X$ sensor.

Methods according to the invention advantageously permit the monitoring of the effectiveness of a three-way catalytic converter by a direct measurement of emissions and by a comparison with calculated emissions values of a reference catalytic converter, which can be obtained by the simulation model. Here, it is advantageously possible for emissions influences which arise from a determination of the oxygen storage capacity in the case of the methods known from the prior art to be prevented in an effective manner.

The simulation model can be formed by an artificial neural network in one or more methods according to the invention. A particularly powerful simulation model can be obtained in this way.

Executing the simulation model can include feeding the processor with the operating variables of lambda probe voltage, torque and speed of the gasoline engine, and the catalytic converter temperature. It is also possible for further operating variables of the gasoline engine and/or of the three-way catalytic converter to be incorporated into the simulation model. Thus, in particular on the basis of the abovementioned operating variables (lambda probe voltage, torque and speed of the gasoline engine and the catalytic converter temperature), which originate from the present driving operation of the motor vehicle, the simulation model executed by the processing device calculates the expected emissions characteristics of the reference catalytic converter and thus provides theoretically calculated emissions values of said reference catalytic converter.

The simulation model used for the modelling of the reference catalytic converter can be designed so to calculate emissions limit values of a catalytic converter that is still suitable for the exhaust-gas aftertreatment. The modeled reference catalytic converter thus forms a "limit catalytic converter" at the limit between a three-way catalytic converter that is still admissible for the exhaust-gas aftertreatment and a three-way catalytic converter which is no longer admissible for this purpose.

An evaluation can be performed by comparison of the calculated emissions values with the measured values of the $NO_X$ sensor, as regards whether or not the three-way catalytic converter is admissible for exhaust-gas aftertreatment of the gasoline engine. It is possible, for this purpose, for an evaluation factor K for the three-way catalytic converter to be calculated on the basis of the measured values of the $NO_X$ sensor and the calculated emissions values of the reference catalytic converter.

The evaluation factor K can be calculated by the following formula:

$$K = \frac{\int \text{measured emissions values of the three-way catalytic converter}}{\int \text{calculated emissions values of the reference catalytic converter}}.$$

An evaluation factor K with a scatter band can be calculated for the reference catalytic converter and be compared with the evaluation factor K of the three-way catalytic converter. If the evaluation factor of the three-way catalytic converter lies below the scatter band, this is a three-way catalytic converter which is admissible for the exhaust-gas aftertreatment. If the evaluation factor of the three-way catalytic converter lies above the scatter band, this is a three-way catalytic converter which is no longer admissible for the exhaust-gas aftertreatment, in particular a significantly aged three-way catalytic converter. If the evaluation factor lies within the scatter band, the three-way catalytic converter is still just suitable for the exhaust-gas aftertreatment.

The measured values of the $NO_X$ sensor can be prepared with the aid of signal pre-processor before being fed to the processor. For this purpose, it is possible in particular for suitable stability criteria to be defined. It is furthermore also possible for reaction and gas propagation times to be corrected.

Referring to FIG. 1, said figure illustrates a three-way catalytic converter 1, 1' by means of which aftertreatment of exhaust gases of a motor vehicle that is equipped with a gasoline engine as drive apparatus can be performed. The flow direction of the exhaust gases has been symbolized here by means of corresponding arrows.

During the exhaust-gas aftertreatment, the pollutants carbon monoxide (CO), nitrogen oxides ($NO_X$) and hydrocarbons (HC) that form during combustion of a fuel-air mixture are converted into carbon dioxide ($CO_2$), nitrogen ($N_2$) and water vapor ($H_2O$). Lambda control is required for effective exhaust-gas aftertreatment with high efficiency of the conversion of the pollutants, which lambda control is performed by means of a lambda probe. It is the aim here for the combustion air ratio $\lambda$, commonly also referred to as air number, to be controlled so as to lie in a narrow range around $\lambda=1$.

In order to permit a determination of the effectiveness of the three-way catalytic converter 1, 1' it is sought below to propose a method in the case of which this determination is performed by means of a direct measurement of emissions. For this purpose, a $NO_X$ sensor means 2a, 2b is provided, which is designed to detect $NO_X$ emissions.

In this context, FIG. 1 shows two possible installation positions of the $NO_X$ sensor means 2a, 2b. It is accordingly possible for the $NO_X$ sensor means 2a to be arranged within the three-way catalytic converter 1, 1'. In an alternative embodiment, provision may be made whereby the $NO_X$ sensor means 2b is arranged downstream-as viewed in a flow direction of the exhaust gases-of the three-way catalytic converter 1, 1'. Since effective exhaust-gas aftertreatment by means of a three-way catalytic converter 1, 1' is possible only in a relatively narrow range around $\lambda=1$ (the so-called Lambda window), the actual combustion air ratio $\lambda$, is detected by means of the lambda probe, and the fuel and/or air quantity is varied such that the combustion air ratio $\lambda$, attains the desired setpoint value. During real operation of the gasoline engine, the combustion air ratio $\lambda$, constantly fluctuates around this setpoint value.

During lean operation of the gasoline engine with $\lambda>1$, $NO_X$ slippage occurs in the three-way catalytic converter 1, 1'. If the gasoline engine is operated with a rich fuel-air mixture, with $\lambda<1$, ammonia forms ($NH_3$). Ammonia is produced as a result of chemical reactions in the three-way catalytic converter during the operation of the gasoline engine with a deficiency of air, wherein the chemical main reaction is in this case the formation of ammonia from nitrogen monoxide and hydrogen.

Figure 2:
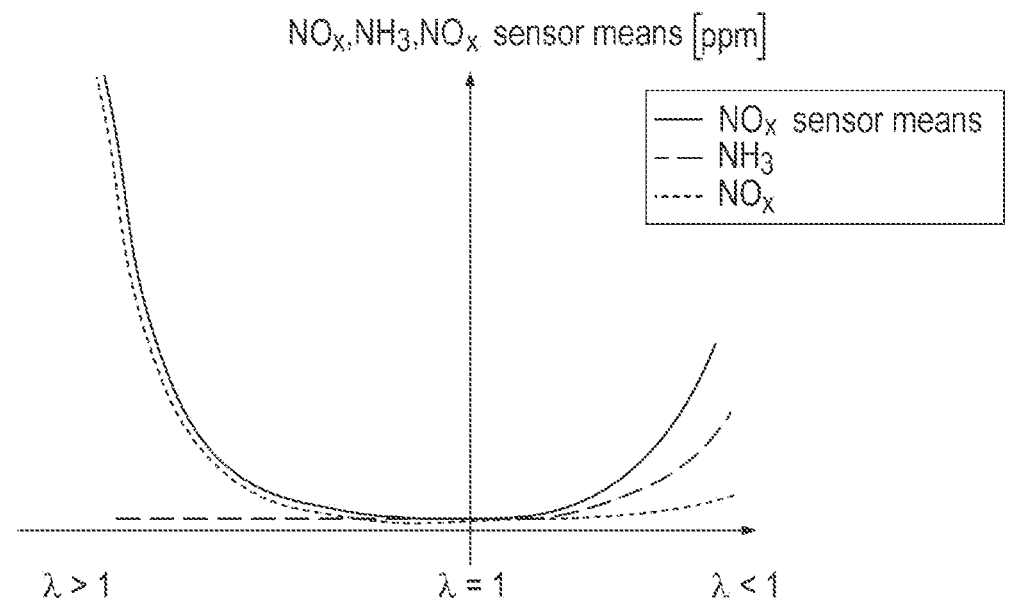
FIG. 2 is a graphic illustration illustrating an influence of the air number on the measurement of $NO_X$ emissions and $NH_3$ emissions.

A problem arises from the fact that the $NO_X$ sensor means 2a, 2b cannot distinguish between $NO_X$ emissions and $NH_3$ emissions. FIG. 2 shows the profile of the emissions measured by the $NO_X$ sensor means 2a, 2b and the components attributable to $NO_X$ and $NH_3$. It is clear that the curved profile is substantially trough-shaped and has a minimum at $\lambda=1$. For $\lambda>1$ (lean operation), the component of the emissions detected by the $NO_X$ sensor means 2a, 2b is made up almost entirely of $NO_X$. By contrast, for $\lambda<1$ (rich operation), the component attributable to $NH_3$ typically corresponds to around 0.8 times the total quantity of the emissions detected by the $NO_X$ sensor means 2a, 2b.

Figure 3:
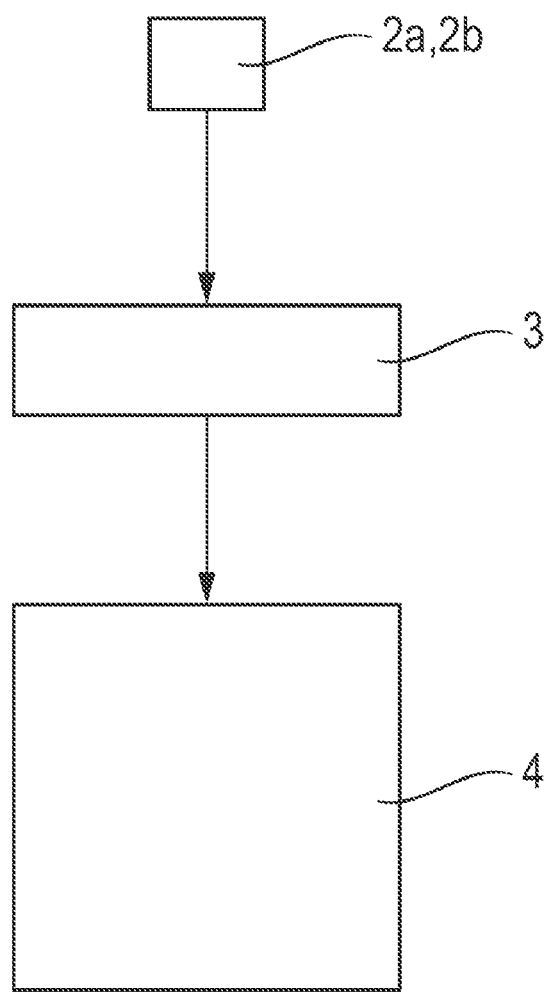
FIG. 3 is a schematic illustration illustrating details of a method for monitoring the effectiveness of a three-way catalytic converter of a gasoline engine.

Details of the evaluation of the measured values of the $NO_X$ sensor means 2a, 2b will be discussed in more detail below with reference to FIG. 3. In order to evaluate the measured values detected by the $NO_X$ sensor means 2a, 2b, a preparation of the measured signals is performed with the aid of signal preparation means 3 in a first step. For this purpose, suitable stability criteria are defined. Furthermore, reaction and gas propagation times are in particular also corrected. For complete evaluation of the effectiveness of the three-way catalytic converter 1, 1', the measured values detected by the $NO_X$ sensor means 2a, 2b include both measured values of the $NO_X$ emissions in lean ranges with $\lambda>1$ and the $NH_3$ emissions in rich ranges with $\lambda<1$.

In a processing device 4, on the basis of the data of a reference catalytic converter, a simulation model is executed by means of simulation software, for example by means of a neural network. Here, emissions values of the reference catalytic converter are calculated on the basis of the operating variables lambda probe voltage, which is detected downstream of the three-way catalytic converter 1, 1', torque and speed of the gasoline engine, and the catalytic converter temperature, which are provided as input variables to the processing device 4. It is basically also possible for further operating variables of the gasoline engine and/or of the three-way catalytic converter 1, 1' to be incorporated into the simulation model.

Output variables of the simulation model, which can subsequently be processed further, are thus the emissions values of the reference catalytic converter as calculated by modelling. The emissions values of the reference catalytic converter that are modeled and obtained by calculation here can subsequently be compared with the real measured values of the $NO_X$ sensor means 2a, 2b, such that it is possible in particular for statements to be made regarding the effectiveness of the exhaust-gas aftertreatment by means of the three-way catalytic converter 1, 1'. A simulation model is preferably used in which the theoretically calculated emissions values of the reference catalytic converter constitute limit values of a catalytic converter that is still just suitable for the exhaust-gas aftertreatment ("limit catalytic converter"). This makes the evaluation of the three-way catalytic converter 1, 1' under examination more straightforward.

In particular on the basis of the abovementioned operating variables lambda probe voltage, torque and speed of the gasoline engine and the catalytic converter temperature, which originate from the present driving operation of the motor vehicle, the simulation model executed by the processing device 4 calculates the expected emissions characteristics of the reference catalytic converter and thus provides theoretically calculated emissions values of said reference catalytic converter. Thus, the simulation model forms, for every operating point, by means of the calculated emissions values of the reference catalytic converter, a limit curve relative to which the emissions characteristics of the three-way catalytic converter 1, 1' that is actually installed in a motor vehicle can be compared.

Figure 4:
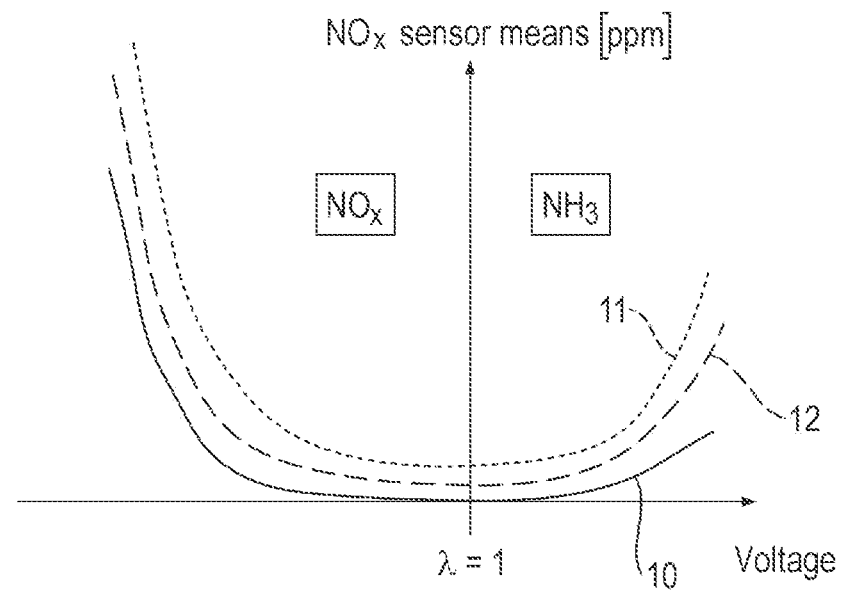
FIG. 4 is a graphic illustration showing the emissions detected by a $NO_X$ sensor as a function of a voltage determined by a lambda probe, for three-way catalytic converters of different age and a reference catalytic converter.

For example, the magnitude of the sensor values measured by the $NO_X$ sensor means 2a, 2b is dependent on the present effectiveness of the exhaust-gas aftertreatment by means of the three-way catalytic converter 1, 1'. This situation is shown in FIG. 4, in which the dependency of the measured values of the $NO_X$ sensor means 2a, 2b on the voltage detected by means of a lambda probe is illustrated for an, in particular new, three-way catalytic converter 1 which is admissible for the exhaust-gas aftertreatment (curve with the reference designation 10), and for a significantly aged three-way catalytic converter 1' which is no longer suitable for effective exhaust-gas aftertreatment (curve with the reference designation 11). Also plotted in FIG. 4 are the emissions values of the reference catalytic converter theoretically calculated by means of the simulation model (curve with the reference designation 12).

It is clear that the emissions values of the significantly aged three-way catalytic converter 1' always lie above, and the emissions values of the, in particular new, three-way catalytic converter 1 that is suitable for the exhaust gas aftertreatment always lie below, the theoretically calculating emissions values of the reference catalytic converter, such that easy distinction and evaluation is possible as regards whether or not the three-way catalytic converter 1, 1' is still effective.

The substantially trough-shaped profiles of the emissions values illustrated in FIG. 4 are dependent on the respective operating point of the three-way catalytic converter 1, 1', which is determined in particular by the load, the operating temperature of the three-way catalytic converter 1, 1' and furthermore also by the combustion air ratio 2. The detected measured values of the $NO_X$ sensor means 2a, 2b correspond to the ranges of a measurement in which the stability criteria are satisfied. For these phases, all necessary items of information regarding the operating point are transmitted to the simulation model.

Figure 5:
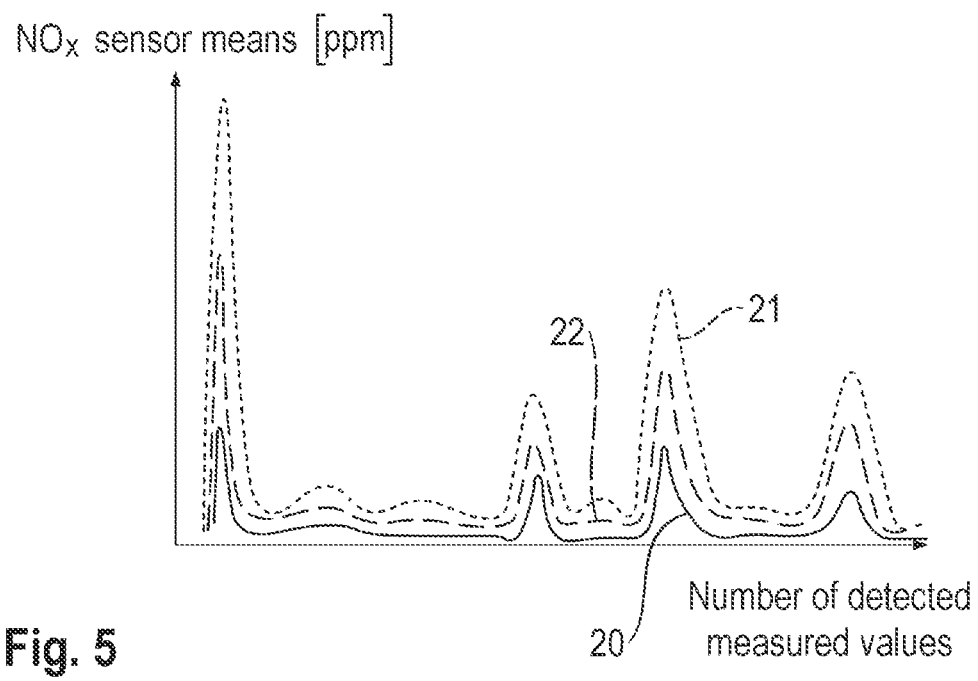
FIG. 5 is a graphic illustration showing the measured values of the $NO_X$ sensor as a function of the number of measured values for the three-way catalytic converters of different age and the reference catalytic converter.

FIG. 5 shows the measured values of the $NO_X$ sensor means 2a, 2b as a function of the number of detected measured values for an admissible, in particular new, three-way catalytic converter 1 (curve with the reference designation 20) and for a three-way catalytic converter 1 which is no longer suitable—for example owing to aging effects (curve with the reference designation 21). Also illustrated are the emissions values of the reference catalytic converter calculated by means of the simulation model (curve with the reference designation 22).

An evaluation of the effectiveness of a three-way catalytic converter 1, 1' may be performed for example by integral formation, by virtue of the integral of the measured values of the $NO_X$ sensor means 2a, 2b of the respective three-way catalytic converter 1, 1' and the integral of the calculated emissions values of the reference catalytic converter being set in relation to one another. For a resulting evaluation factor K, the result is then:

$$K = \frac{\int \text{measured emissions values of the three-way catalytic converter}}{\int \text{calculated emissions values of the reference catalytic converter}}.$$

Figure 6:
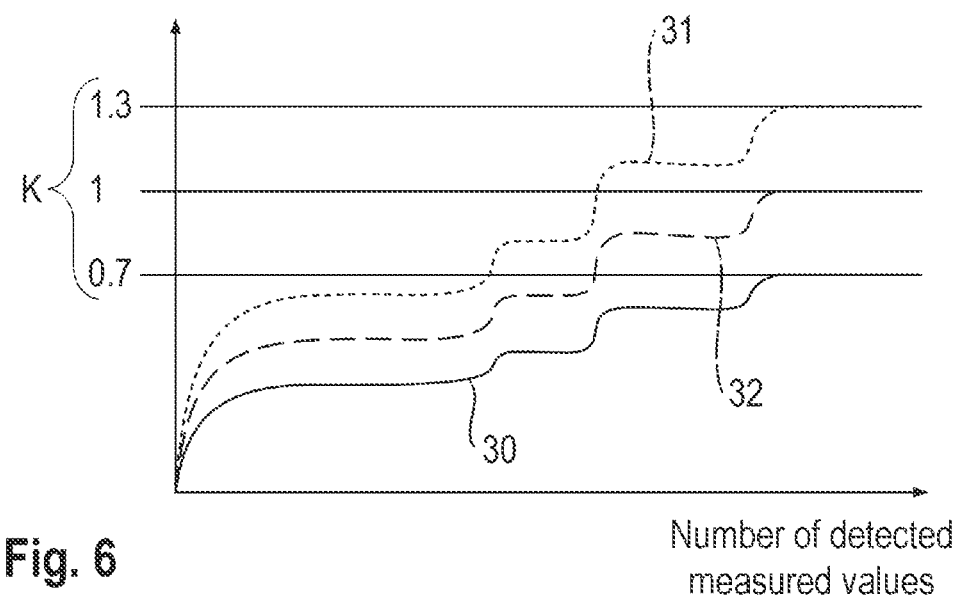
FIG. 6 is a graphic illustration showing the magnitudes of the integrals of the measured values of the $NO_X$ sensor as a function of the number of measured values for the three-way catalytic converters of different age and the reference catalytic converter.

For the illustration of the integrals in FIG. 6 as a function of the number of measured values for an admissible, in particular new, three-way catalytic converter 1 (curve with the reference designation 30), a three-way catalytic converter 1' which is no longer admissible (curve with the reference designation 31) and for the reference catalytic converter (curve with the reference designation 32), exemplary values for the evaluation factors K thereof are plotted in this illustration.

Figure 7:
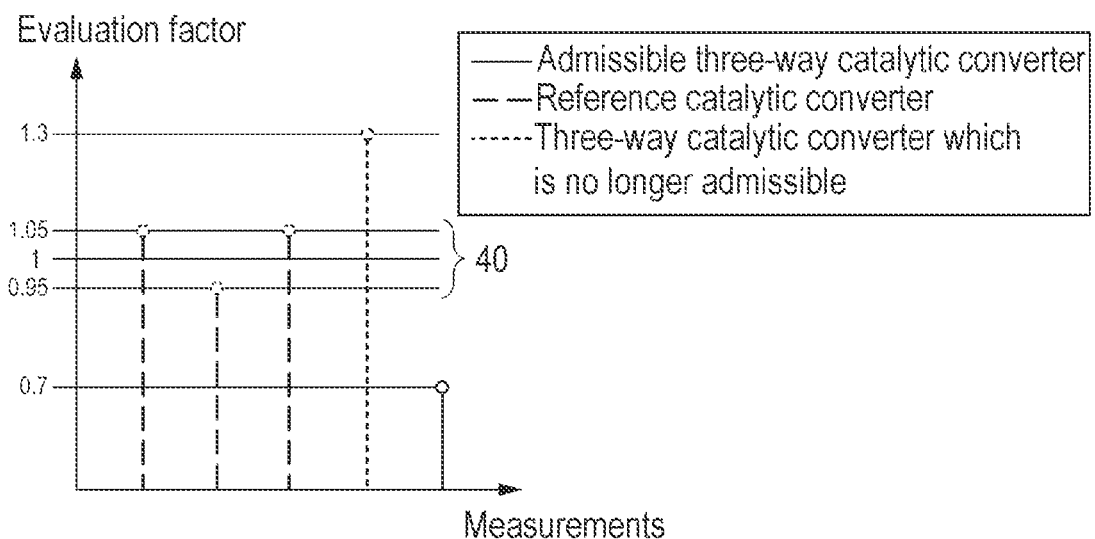
FIG. 7 is a graphic illustration of the evaluation factors of the three-way catalytic converters of different age and of the reference catalytic converter.

As can be seen in FIG. 7, the evaluation factor K for the reference catalytic converter lies in a scatter band 40 around the factor K=1 (in the present case between 0.95 and 1.05). Depending on whether the evaluation factor K of the three-way catalytic converter 1, 1' under consideration lies below or above said scatter band 40, it is possible for a reliable statement to be made regarding whether the emissions characteristics of the respective three-way catalytic converter 1, 1' satisfy the prerequisites for effective exhaust-gas aftertreatment (K lies below the scatter band 40) or not (K lies above the scatter band 40).

Figure 8:
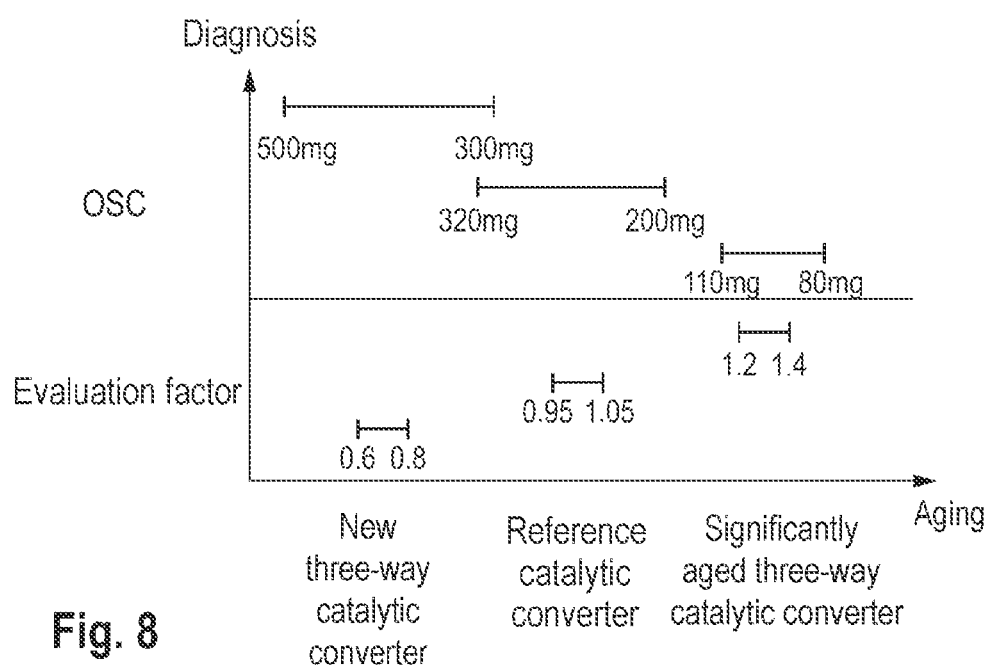
FIG. 8 shows a comparison of the evaluation factors with OSC values that have been obtained by a method known from the prior art.

The evaluation factors K of admissible, in particular new, three-way catalytic converters 1 and of significantly aged three-way catalytic converters 1' likewise lie in a scatter band. FIG. 8 shows the evaluation factors K of admissible, in particular new, three-way catalytic converters 1, reference catalytic converters and significantly aged three-way catalytic converters 1', which are thus no longer suitable for effective exhaust gas aftertreatment, with their respective scatter bands. Furthermore, this illustration also includes values corresponding to the corresponding stages of aging, which values have been obtained by means of a determination of the available oxygen storage capacity (for short: OSC diagnosis) of the three-way catalytic converters 1, 1'.

In the prior art, the effectiveness of a three-way catalytic converter 1, 1' of a gasoline engine is evaluated indirectly through a determination of the available oxygen storage capacity (OSC). Here, the combustion air ratio λ, alternates between λ<1 (rich mixture) and λ>1 (lean mixture), such that, by means of the quantity of oxygen introduced into the three-way catalytic converter 1, 1', it is possible to calculate the present value of the oxygen storage capacity, also referred to as the OSC value. Since it is necessary here for the monitored catalytic converter volume to be brought up to or close to the rich/lean breakthrough, this can under some circumstances result in a very great influence on the emissions result.

Corresponding OSC values for the reference catalytic converter are likewise illustrated in FIG. 8. From a comparison of the evaluation factors K with the corresponding OSC values, it becomes clear that, with the aid of the method proposed here, it is possible to achieve much greater selectivity then with the OSC diagnosis, such that a clear distinction between the different stages of aging of the three-way catalytic converter 1, 1' is possible. From the OSC values of the admissible, in particular new, three-way catalytic converter 1 and of the reference catalytic converter, it is clear that such selectivity cannot be attained with the OSC diagnosis, because the OSC values partially overlap one another and thus a clear distinction is not possible. The method proposed here advantageously makes it possible for influencing of the emissions, such as results from the determination of the oxygen storage capacity in the prior art, to be prevented in an effective manner.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for monitoring effectiveness of a three-way catalytic converter of a gasoline engine, the method comprising:
    detecting emissions of the gasoline engine by an NOX sensor arranged within the three-way catalytic converter or downstream of the three-way catalytic converter in an exhaust-gas flow direction;
    transmitting values measured by the NOX sensor together with operating variables of the gasoline engine and/or of the three-way catalytic converter to a processor, wherein the processor is configured to execute a simulation model and thereby calculate emissions values of a reference catalytic converter on the basis of the operating variables; and
    comparing the calculated emissions values with the values measured by the NOX sensor,
    wherein the operating variables include a lambda probe voltage, torque and speed of the gasoline engine, and a catalytic converter temperature.

2. The method as claimed in claim 1, wherein the simulation model is formed by an artificial neural network.

3. The method as claimed in claim 1, wherein the simulation model is designed to calculate emissions limit values of a catalytic converter that is still suitable for exhaust-gas aftertreatment.

4. The method as claimed in claim 1, wherein comparing the calculated emissions values with the values measured by the NOX sensor includes performing an evaluation regarding whether or not the three-way catalytic converter is admissible for exhaust-gas aftertreatment of the gasoline engine.

5. The method as claimed in claim 4, wherein an evaluation factor K for the three-way catalytic converter is calculated based on the measured values of the NOX sensor and the calculated emissions values of the reference catalytic converter.

6. The method as claimed in claim 5, wherein the evaluation factor K is calculated by the following formula:

$$K = \frac{\int \text{measured emissions values of the three-way catalytic converter}}{\int \text{calculated emissions values of the reference catalytic converter}}.$$

7. The method as claimed in claim 5, wherein a second evaluation factor including a scatter band is calculated for the reference catalytic converter and is compared with the evaluation factor K of the three-way catalytic converter.

8. The method as claimed in claim 1, wherein the measured values of the NOX sensor are prepared with aid of a signal pre-processor before being fed to the processor.

9. A method for monitoring effectiveness of a three-way catalytic converter of a gasoline engine, the method comprising:
   detecting emissions of the gasoline engine by an NOX sensor arranged within the three-way catalytic converter or downstream of the three-way catalytic converter in an exhaust-gas flow direction;
   transmitting values measured by the NOX sensor together with operating variables of the gasoline engine and/or of the three-way catalytic converter to a processor, wherein the processor is configured to execute a simulation model and thereby calculate emissions values of a reference catalytic converter on the basis of the operating variables; and
   comparing the calculated emissions values with the values measured by the NOX sensor,
   wherein comparing the calculated emissions values with the values measured by the NOX sensor includes performing an evaluation regarding whether or not the three-way catalytic converter is admissible for exhaust-gas aftertreatment of the gasoline engine,
   wherein an evaluation factor K for the three-way catalytic converter is calculated based on the measured values of the NOX sensor and the calculated emissions values of the reference catalytic converter, and
   wherein the evaluation factor K is calculated by the following formula:

$$K = \frac{\int \text{measured emissions values of the three-way catalytic converter}}{\int \text{calculated emissions values of the reference catalytic converter}}.$$

10. The method as claimed in claim 9, wherein the simulation model is formed by an artificial neural network.

11. The method as claimed in claim 9, wherein the operating variables include a lambda probe voltage, torque and speed of the gasoline engine, and a catalytic converter temperature.

12. The method as claimed in claim 9, wherein the simulation model is designed to calculate emissions limit values of a catalytic converter that is still suitable for exhaust-gas aftertreatment.

13. The method as claimed in claim 9, wherein the measured values of the NOX sensor are prepared with aid of a signal pre-processor before being fed to the processor.

14. The method as claimed in claim 9, wherein a second evaluation factor including a scatter band is calculated for the reference catalytic converter and is compared with the evaluation factor K of the three-way catalytic converter.

15. A method for monitoring effectiveness of a three-way catalytic converter of a gasoline engine, the method comprising:
   detecting emissions of the gasoline engine by an NOX sensor arranged within the three-way catalytic converter or downstream of the three-way catalytic converter in an exhaust-gas flow direction;
   transmitting values measured by the NOX sensor together with operating variables of the gasoline engine and/or of the three-way catalytic converter to a processor, wherein the processor is configured to execute a simulation model and thereby calculate emissions values of a reference catalytic converter on the basis of the operating variables; and
   comparing the calculated emissions values with the values measured by the NOX sensor,
   wherein comparing the calculated emissions values with the values measured by the NOX sensor includes performing an evaluation regarding whether or not the three-way catalytic converter is admissible for exhaust-gas aftertreatment of the gasoline engine,
   wherein an evaluation factor K for the three-way catalytic converter is calculated based on the measured values of the NOX sensor and the calculated emissions values of the reference catalytic converter, and
   wherein a second evaluation factor including a scatter band is calculated for the reference catalytic converter and is compared with the evaluation factor K of the three-way catalytic converter.

16. The method as claimed in claim 15, wherein the simulation model is formed by an artificial neural network.

17. The method as claimed in claim 15, wherein the operating variables include a lambda probe voltage, torque and speed of the gasoline engine, and a catalytic converter temperature.

18. The method as claimed in claim 15, wherein the simulation model is designed to calculate emissions limit values of a catalytic converter that is still suitable for exhaust-gas aftertreatment.

19. The method as claimed in claim 15, wherein the measured values of the NOX sensor are prepared with aid of a signal pre-processor before being fed to the processor.

* * * * *